(12) United States Patent
Wilkerson

(10) Patent No.: US 7,114,059 B2
(45) Date of Patent: Sep. 26, 2006

(54) SYSTEM AND METHOD TO BYPASS EXECUTION OF INSTRUCTIONS INVOLVING UNRELIABLE DATA DURING SPECULATIVE EXECUTION

(75) Inventor: Christopher B. Wilkerson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 698 days.

(21) Appl. No.: 09/992,881

(22) Filed: Nov. 5, 2001

(65) Prior Publication Data

US 2003/0088759 A1  May 8, 2003

(51) Int. Cl.
G06F 15/78  (2006.01)
G06F 9/38  (2006.01)

(52) U.S. Cl. ............... 712/217; 712/218; 712/219; 712/239

(58) Field of Classification Search ........ 712/216–219, 712/233–244
See application file for complete search history.

(56) References Cited

U.S. PATENT DOCUMENTS

| 5,428,807 | A |   | 6/1995  | McKeen et al. |         |
|-----------|---|---|---------|---------------|---------|
| 5,465,342 | A |   | 11/1995 | Walsh         |         |
| 5,651,125 | A | * | 7/1997  | Witt et al.   | 712/218 |
| 5,799,179 | A | * | 8/1998  | Ebcioglu et al. | 712/234 |
| 5,832,293 | A |   | 11/1998 | Popescu et al. |        |
| 5,933,627 | A | * | 8/1999  | Parady        | 712/228 |
| 5,987,595 | A | * | 11/1999 | Yoaz et al.   | 712/216 |

FOREIGN PATENT DOCUMENTS

| EP | 0381246     | 8/1990  |
| EP | 0810519     | 12/1997 |
| EP | 1026582     | 9/2000  |
| EP | 1058186     | 12/2000 |
| WO | WO 98/21684 | 5/1998  |

OTHER PUBLICATIONS

IEEE Micro, "Introducing The IA-64 Architecture", J. Huck, et al., vol. 20, No. 5, Sep. 2000, pp. 12-23.
Computer Architecture News, "Unconstrained Sepculative Execution with Predicated State Buffering", H. Ando, et al, vol. 23, No. 2, May 1, 1995, pp. 126-137.

* cited by examiner

*Primary Examiner*—Fritz Fleming
*Assistant Examiner*—Tonia L. Meonske
(74) *Attorney, Agent, or Firm*—Blakely, Sokoloff, Taylor & Zafman LLP

(57) ABSTRACT

System and method to reduce execution of instructions involving unreliable data in a speculative processor. A method comprises identifying scratch values generated during speculative execution of a processor, and setting at least one tag associated with at least one data area of the processor to indicate that the data area holds a scratch value. Such data areas include registers, predicates, flags, and the like. Instructions may also be similarly tagged. The method may be executed by an execution engine in a computer processor.

30 Claims, 9 Drawing Sheets

SYSTEM AND METHOD TO BYPASS EXECUTION OF INSTRUCTIONS INVOLVING UNRELIABLE DATA DURING SPECULATIVE EXECUTION

BACKGROUND

1. Field of the Invention

This invention relates to computer processor architecture, and more particularly to a system and method for marking registers during speculative execution to distinguish between usable data and unusable data.

2. Background

Historically, computer processors executed instructions one at a time in the order presented to the processor. As processors have advanced, the concepts of pipelining, looking ahead, out of order processing, and speculative execution have been incorporated in many of the more popular computer processors, including those used in personal computers. These techniques allow a computer processor to execute independent instructions while waiting for other high latency instructions to produce their result. The ability to continue to execute instructions and use execution resources while waiting for a high latency instruction is important in achieving high performance in current day processors. Although advancements in processor design have drastically improved the latency for typical processor instructions, the latency of instructions that must access memory have improved only slightly. For example, in some current day processors it may take 1000 times longer for the processor to execute a "load" involving a cache miss when compared to the time needed to process and "add". This is because the cache miss requires the processor to retrieve needed data from memory to complete executing the load instruction.

As such, when implementing the performance increasing techniques mentioned above, when a cache miss occurs, the processor has a lot of time within which to do work. Some of the speculative execution performed by the processor creates data that is not accurate and must be deleted as unuseful. In this way, the processor may speculatively execute many instructions needlessly. For example, scratch mode execution may allow for execution based on branch predictions by allowing the processor to speculatively execute instructions following a cache miss. However, in many circumstances, the execution continues based on invalid data contained in the destination register of the load that missed the cache.

Invalid data produced by a cache miss may be propagated through multiple levels of instructions that are ultimately dependent on the invalid data. As such, the invalid data renders the results of these instructions or sequences of instructions generally useless. Therefore, execution of instructions that consume values resulting from cache misses may negatively impact the benefits achieved through speculative execution. Loads depending on invalid data offer no prefetching benefit and can cause translation look-aside buffer and/or cache pollution. In addition, branches depending on invalid data are often resolved incorrectly, steering scratch mode execution off of the branch path indicated by the branch predictor and/or rendering the results useless.

BRIEF DESCRIPTION OF THE DRAWINGS

Additional advantages of the invention will become apparent upon reading the following detailed description and upon reference to the drawings, in which.

DETAILED DESCRIPTION

Figure 1A:
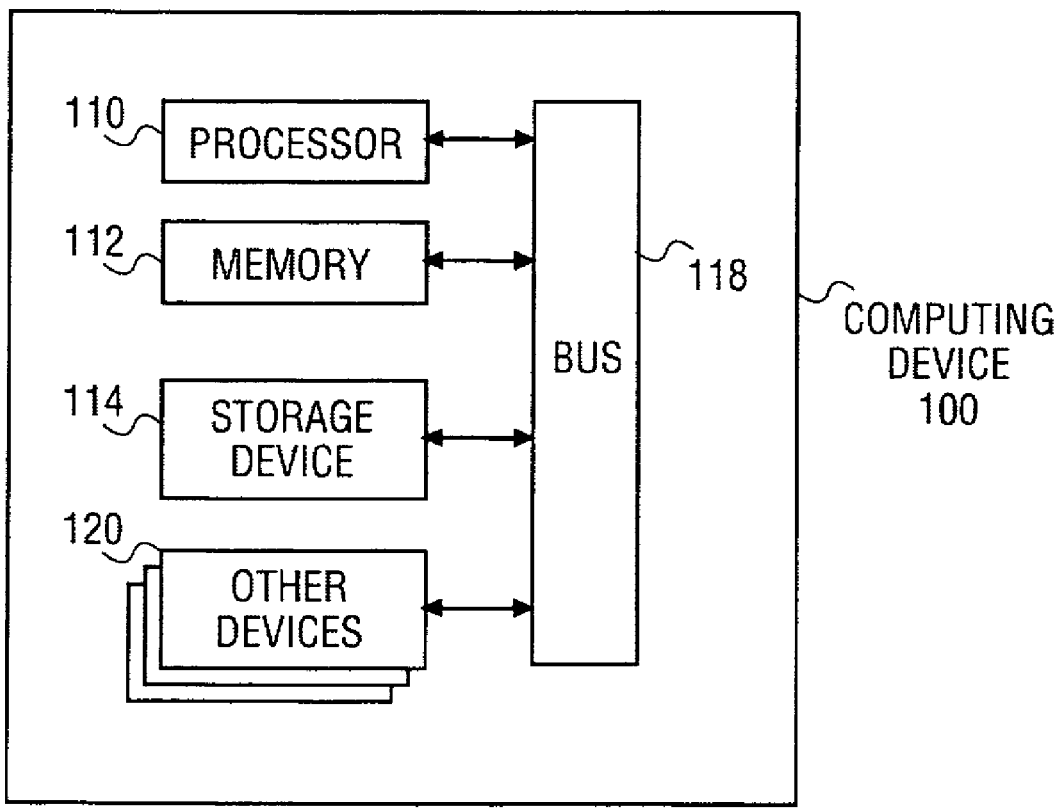
FIG. 1A illustrates a hardware environment in which the systems and methods described herein may be implemented.

A system and method are provided for distinguishing between usable, reliable values and unusable, unreliable values generated during speculative execution of a computer processor. Such speculative execution includes, for example, pipelining, looking ahead, out of order processing, and scratch mode execution. In one embodiment, a processor is enabled to selectively quash instructions and branches involving data derived from a cache miss. The results are that power consumption of the processor is reduced, execution resources of the processor are conserved, and throughput of the processor is increased. In one embodiment, a tag in the form of a single bit is added to each data storage area with a processor, including registers, predicates, flags, etc. to provide a cost efficient way to increase performance and reduce power consumption.

In some processors, out-of-order (OOO) execution is achieved by buffering speculative instructions in a re-order buffer (ROB) until the instructions become non-speculative. That is, until the data involved in the instruction, whether source or destination, is available or accessible. When instructions become non-speculative, they can be executed and retired. Since instructions can only be retired once they become non-speculative, they may be buffered in the ROB for hundreds of clock cycles before they are finally executed and retired. Since each new instruction must be allocated a ROB entry before it can be executed, from hundreds to thousands of ROB entries may be required to allow the processor to continue to progress while waiting for a high latency instruction to complete.

Scratch Mode Execution (SME) is a form of speculative execution that allows the processor to tolerate the latency of high latency instructions without requiring hundreds of ROB entries to make forward progress. Like today's out-of-order (OOO) execution processors, SME deals with high latency instructions by continuing the execution of independent instructions without waiting for the correct results of high latency instructions. Unlike OOO execution, SME does not buffer speculative instructions. Instead, SME executes speculative instructions and only preserves the result until the register is overwritten by another instruction. Since SME does none of the bookkeeping to ensure that the speculatively executed instructions can be retired, all speculatively executed instructions must be discarded and re-executed by the processor. However, since many high latency instructions (e.g., loads and branches) have side effects such as cache allocations and updates of the branch predictor, the latency of these of instructions is often reduced significantly by re-execution.

Throughout the discussion herein, invalid data produced by a cache miss and all data values produced by instructions and data dependent on the invalid data are referred to as scratch values (SVals). Other data values not deriving from SVals are referred to as reliable values (RVals). In general, the execution of instructions dependent on SVals is ineffective and may be counter-productive. One study has shown that forty percent of all instructions executed during scratch mode are dependent on SVals and can be ignored completely. The methods described herein involve handling the instructions dependent on SVals and the instructions dependent on RVals differently. In one embodiment, significant performance gains are provided by preventing SVal loads from accessing the cache and by allowing the branch predictor to override branch resolutions based on SVals.

FIG. 1A illustrates a hardware environment in which the systems and methods described herein may be implemented. In one embodiment, the methods described herein may be implemented on computing device 100. Computing device 100 may be a personal computer, server, personal digital assistant (PDA), computer tablet, set-top box, game console, cellular telephone workstation, or other computing device. Computing device 100 includes processor 110, memory 112, storage device 114, and other devices all of which are coupled to bus 118. For simplicity, only one bus is depicted as discussed herein, even though multiple buses may be included in computing device 100, including, for example, data buses, instruction buses, peripheral buses such as peripheral component interconnect (PCI) and accelerated graphics port (AGP), etc.

Generally, when a processor executes a software program, it may be retrieved from storage device 114. When processor 110 executes a particular software program, and data and/or instructions are not readily available to the processor in a cache memory within the processor, the processor may block and wait for the instructions and/or data to be loaded from an off-chip source such as, for example, the storage device and the main memory. In view of the speed of current processors, the processor will have much wasted time if it were to wait for the instruction and/or data to be retrieved from the storage device or the memory. This wasted time is due to bus latency and the latency inherent in reading information from a comparatively slow device. (The bus speed, memory speed and storage device speed are each much slower than the speed of the processor.) Such latency may be thousands of clock cycles.

It is well known that various techniques, including looking ahead, pipelining, out of order processing, scratch mode execution, and speculative execution allow a processor to proceed while waiting for the data to be recovered from the memory or the storage device. All of these techniques will generally be referred to as speculative processing herein. When processor 110 speculatively executes instructions while waiting for data to be loaded or otherwise retrieved from memory 112 and storage device 114, various data values are processed, branches taken, and other execution conducted based on unreliable SVals. To alleviate the wasted execution of instructions based on or otherwise involving SVals, according to the methods described herein, an SVal tag is added to each of the registers, flags, predicates, and other data locations within a processor, such as processor 110.

In one embodiment, each data storage location in a processor may be augmented with an SVal tag in the form of a single bit. In this embodiment, each register, predicate, flag, etc. may have an additional bit appended called an SVal tag bit. If the SVal tag bit is set to one (1), for example, the associated data is a scratch value or SVal. If the bit is set at zero (0), the marked/associated data is a reliable value or RVal. It is to be appreciated that in another embodiment, SVal tag bit values can alternatively be set to opposite values consistently such that a bit value of one (1) indicates a reliable value and a bit value of zero (0) indicates a scratch value. In one embodiment, predicates and flags may also have similar associated SVal tags. In one embodiment, when an instruction with a scratch value operand writes to either a predicate or a flag, the SVal tag associated with the flag or predicate is set to one (1). When a branch is resolved using the flag or predicate with the SVal tag, the computed result of the branch is ignored and the direction of the branch is determined by the branch prediction unit. In addition, instructions may also be augmented with an SVal tag in the form of a single bit referred to as an SVal tab bit. In this embodiment, if the SVal bit is set to one (1), the associated instruction produces a scratch value; and if the SVal bit is set to zero (0), the associated instruction produces a reliable value. In other embodiments, the SVal tags associated with each register, predicate, flag, instruction, etc. may have a size of two or more bits.

Figure 1B:
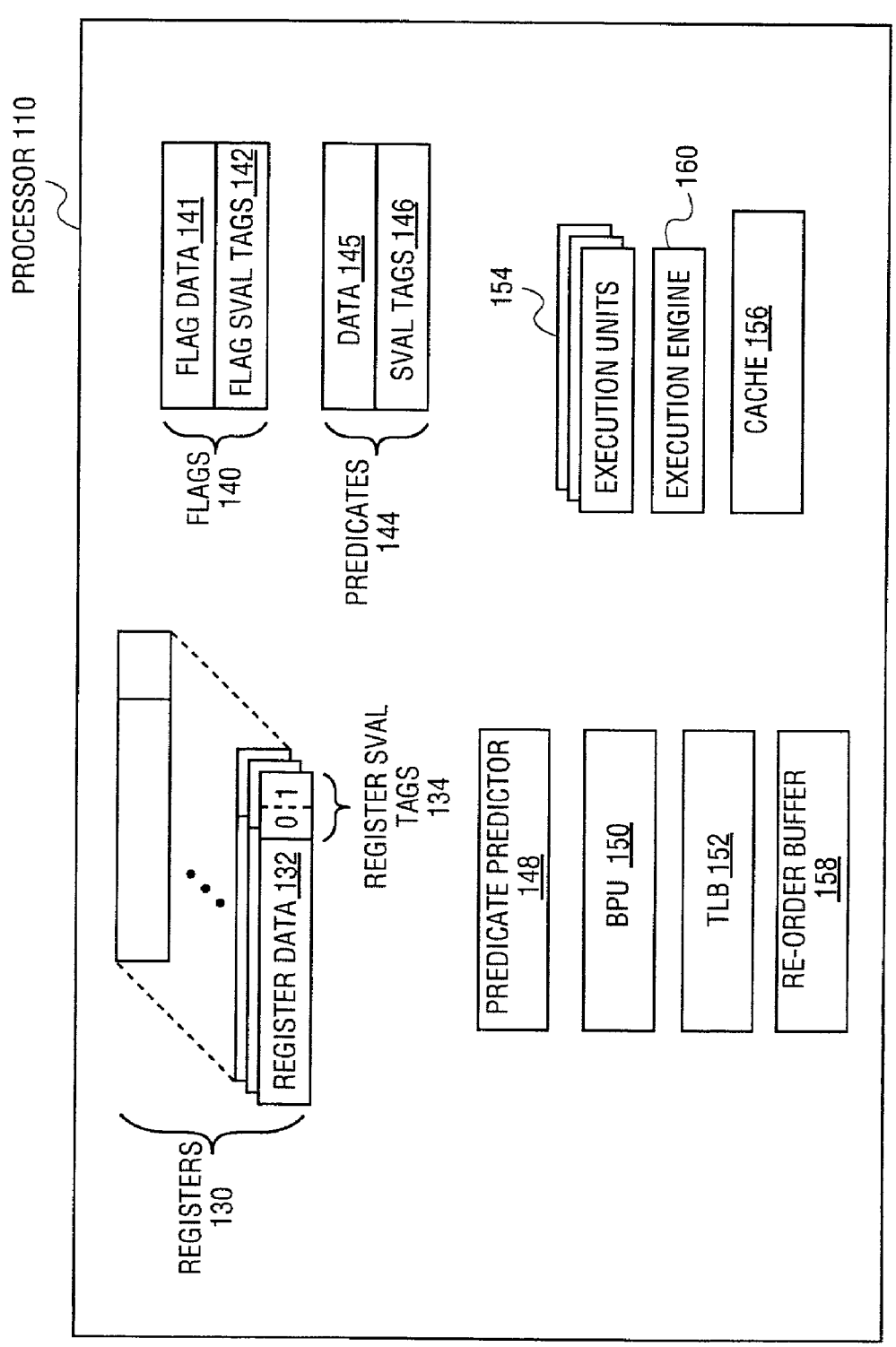
FIG. 1B illustrates some of the internal components of an embodiment of a processor having SVal tags according to the systems and methods described herein.

FIG. 1B illustrates some of the internal components of an embodiment of a processor having SVal tags according to the systems and methods described herein. In one embodiment, processor 110 may include various registers 130, each of which include register data 132 and register SVal tags 134. Whenever an instruction based on an SVal creates data to be written to a register, that register's SVal tag will be set to, for example, one (1). In various embodiments, an SVal tag may be a single bit, two bits, or a larger entity. It will be appreciated that the smaller the number of bits allocated to the SVal, the more efficient a resulting processor will be as less space on the processor's die will be needed to support SVal tags. Processor 110 may also include flags 140 in which a plurality of flag data 141 is augmented by a plurality of flag SVal tags 142 corresponding to each of the flags in flag data 141. Similarly, predicates 144 include predicate data 145 and corresponding SVal tags 146. In addition, processor 110 includes well known components such as predicate prediction unit 148, branch prediction unit (BPU) 150, translation look aside buffer (TLB) 152, execution units 154, on-chip cache 156, and re-order buffer 158. Execution units 152 may be adders, floating-point multiplier accumulators, and other execution units, appearing singularly or in multiples. Processor 110 may include other well known components and multiple instances of shown components which are not shown to avoid obscuring the details of the invention described herein. For example, the processor may have two or more on chip memory caches.

To take advantage of the addition of SVal tags within a processor, a processor's internal execution engine 160 may be written to implement the methods described herein. The execution engine may be embodied in a processor as hardware components that contain hardwired logic, or by any combination of programmed computer components and custom hardware components. In another embodiment, the execution engine may be stored as instructions or microcode in a machine readable form on a machine readable medium and then transferred to processor 110. A machine-readable medium includes, Read-Only Memory (ROM) devices, Random Access Memory (RAM) devices, Erasable Programmable Read-Only Memory (EPROM) devices, Electrically Erasable Read-Only Memory (EEPROM)

devices, magnetic disk storage media such as hard disk drivers, optical storage media such as Compact Disc Read-Only Memory (CD-ROM), flash memory devices, etc which may be coupled locally or accessible remotely and available via electrical, optical, acoustical or other form of propagated signals (e.g., carrier waves, infrared signals, digital signals, etc.), and any other type of machine readable medium suitable for storing instructions, micro-code, etc.

Figure 2A:
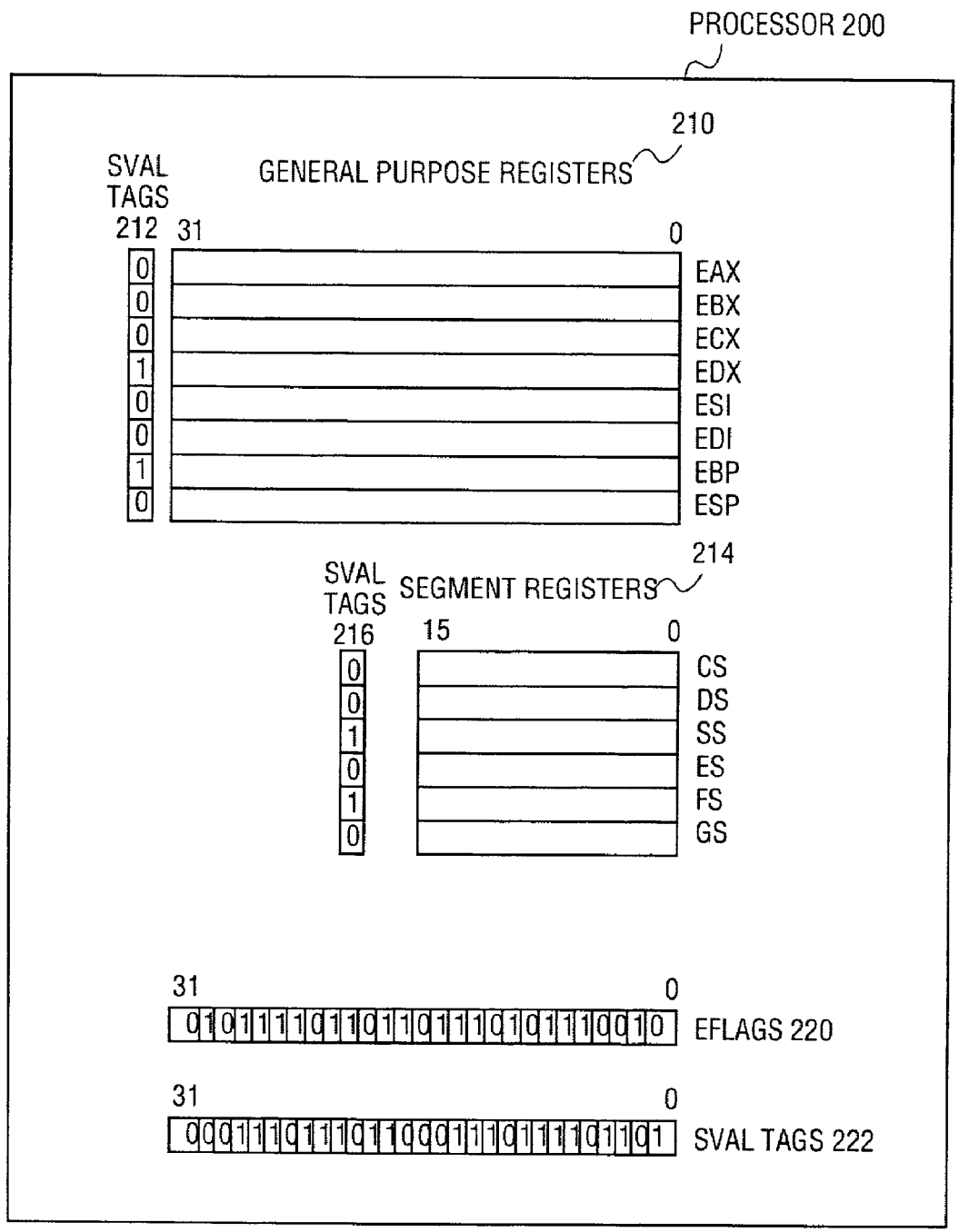
FIG. 2A illustrates an embodiment of a processor having SVal tags according to the systems and methods described herein and conforming to the Intel IA-32 architecture.

FIG. 2A illustrates an embodiment of a processor having SVal tags according to the systems and methods described herein and conforming to the Intel IA-32 architecture. In one embodiment, SVal tags may augment the registers, flags, and other pertinent data storage areas within processors conforming to the 32 bit Intel architecture known as IA-32. For further information regarding the IA-32 architecture see *IA-32 Intel Architecture Software Developer's Manual*, Rev. 2 (February 2001). In one embodiment, processor 200 may include general purpose registers 210 augmented by corresponding general purpose register SVals 212. In addition, segment registers 214 may be augmented by segment register SVal tags 216. Further, E Flags 220 may be augmented by E Flag SVal tags 222. As shown in processor 200, each of the SVal tags corresponding to each of the registers and each of the flags may be a single bit. In other embodiments, the SVal tags may be two bits, or larger.

Figures 1, 2B:
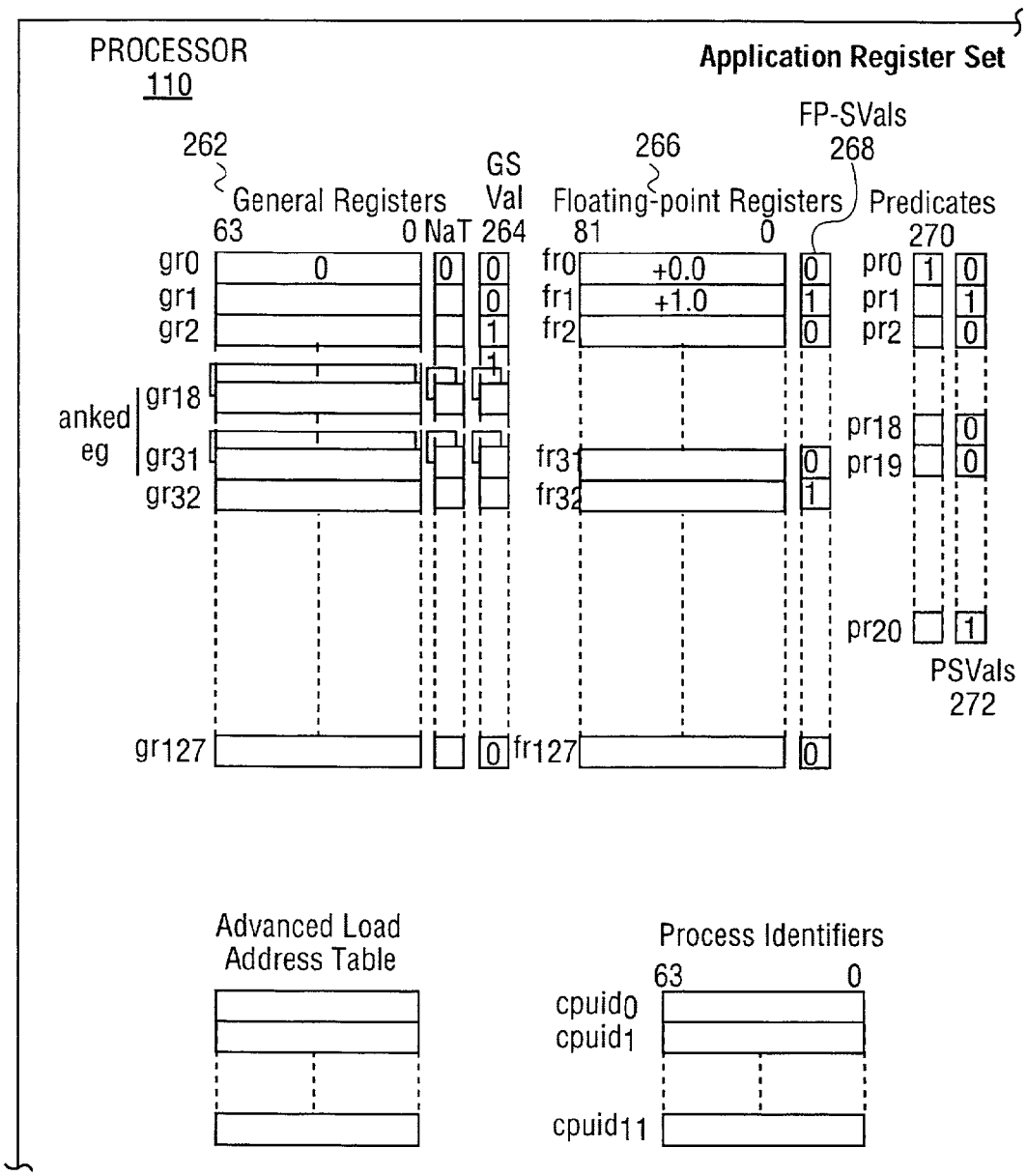
FIG. 2B illustrates an embodiment of a processor having SVal tags according to the systems and methods described herein and conforming to the Intel IA-64 architecture.
Figures 2, 2B:
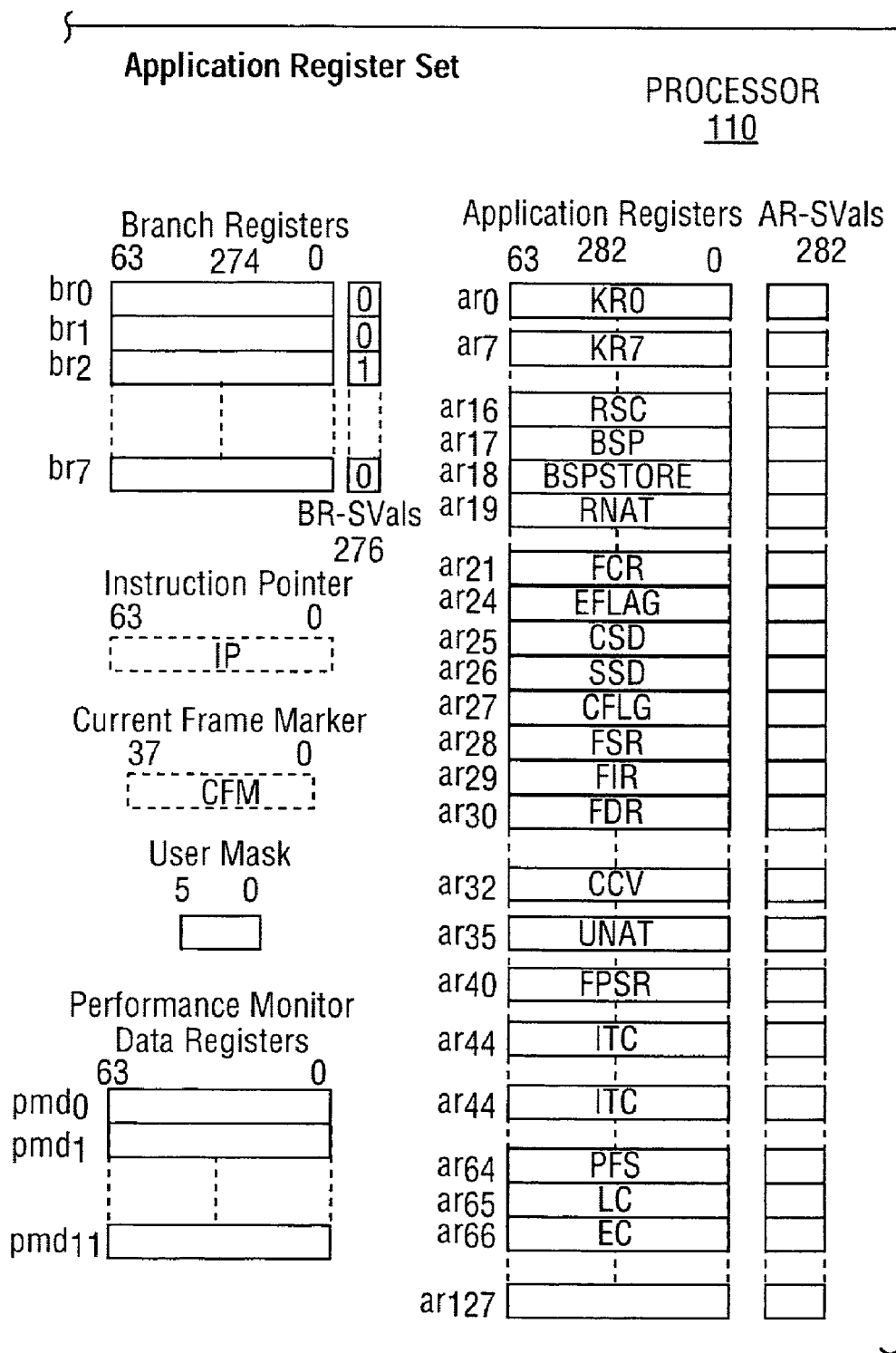

FIG. 2B illustrates an embodiment of a processor having SVal tags according to the systems and methods described herein and conforming to the Intel IA-64 architecture. In one embodiment, SVal tags may be added to each of the pertinent registers, including floating-point, branch, data and general purpose registers, predicates, flags, and other internal data repositories within a processor conforming to Intel's 64 bit architecture known as IA-64. For more information regarding the IA-64 architecture see *Intel IA-64 Architecture Software Developer's Manual*, Rev. 1.1 (July 2000) available from Intel Corporation of Santa Clara, Calif. In this embodiment, general registers 262 may be augmented by general register SVal tags 264, floating-point registers 266 may be augmented by floating-point SVal tags 268, predicates 270 may be augmented by predicate SVal tags 272, branch registers 274 may be augmented by branch register SVal tags 276, and application registers 280 may be augmented by application register SVal tags 282. As shown in processor 260, each of the SVal tags may be one bit. In other embodiments, the SVal tags may be two bits or more than two bits in size.

Figures 2, 2B, 3:
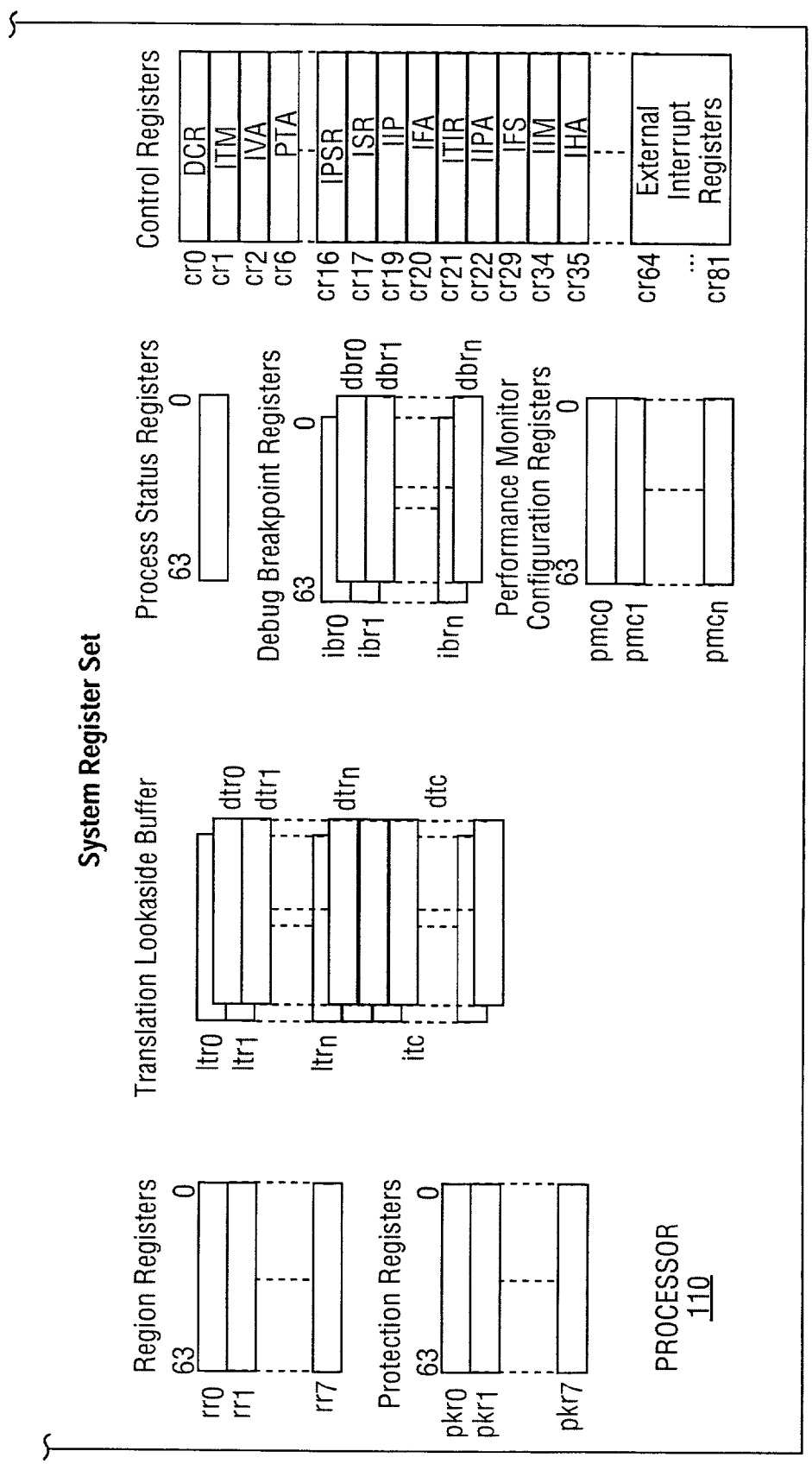
FIG. 3 illustrates a general flow of actions taken when processing an instruction and its operands according to an embodiment of a method described herein.
Figure 3:
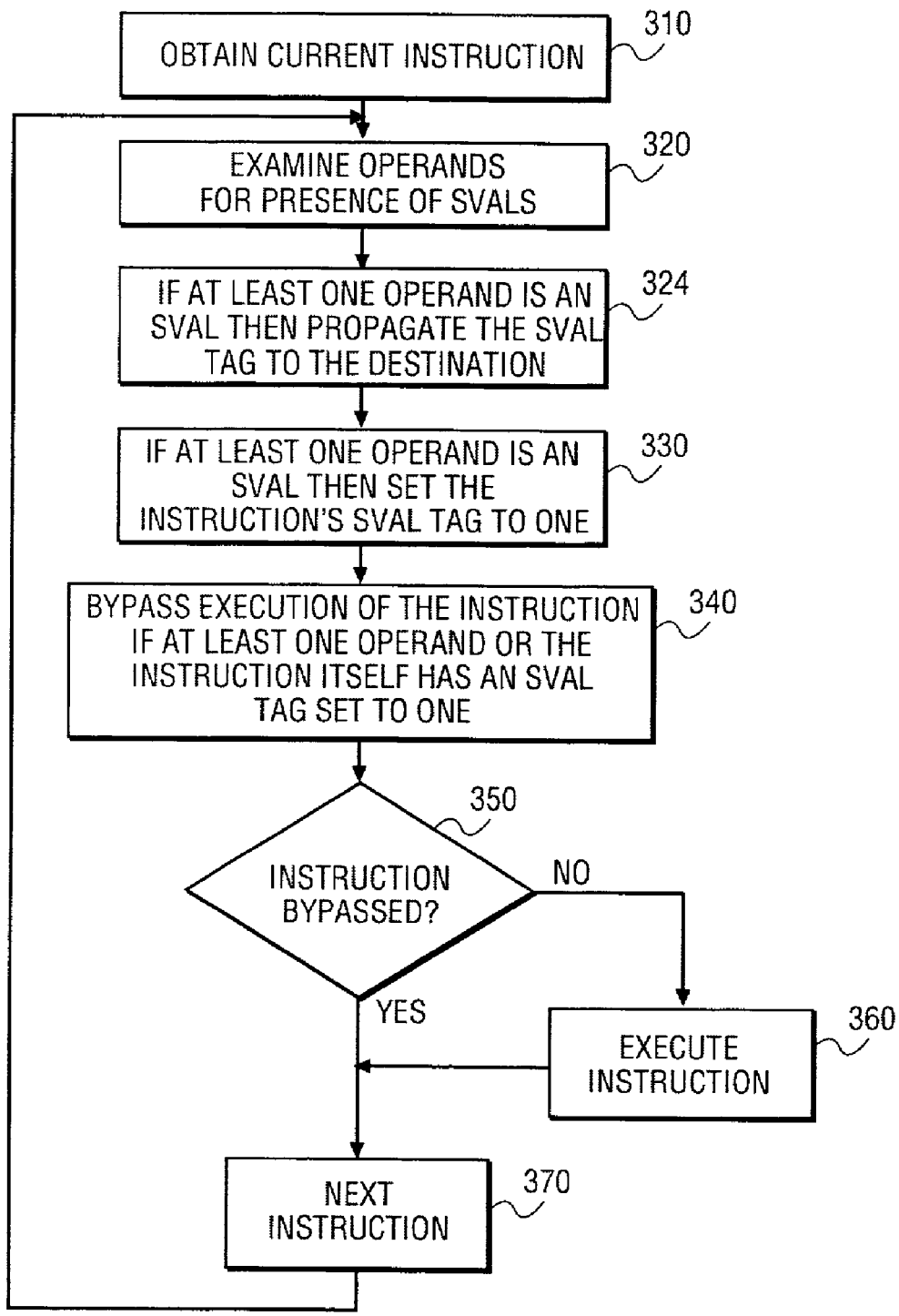

FIG. 3 illustrates a general flow of actions taken when processing an instruction and its operands according to an embodiment of a method described herein. This flow of actions may be achieved by a processor, and, more specifically, the execution engine within a processor. A current instruction is obtained, as show in block 310. In one embodiment, when a new instruction is fetched into the pipeline, the instruction's SVal tag is initially set to zero (0). The operands of the instruction are then examined for the presence of SVals, as shown in block 320. When the instruction's operands are known, the SVal tag of the instruction is set according to the SVal tag value of its operands. If none of the SVal tags of the instruction's operands are set to one (1), the instruction's SVal tag retains its initial value of zero (0). If at least one operand of the current instruction is an SVal, then the SVal tag is propagated to the destination, as shown in block 324, such that the SVal tag of the destination is set to one (1). If the SVal tag of at least one of the instruction's operands is an SVal, that is it is set to one (1), the SVal tag associated with the instruction is set to one (1), as shown in block 330. Execution of the instruction is bypassed if at least one operand of the instruction has an SVal set to one, as shown in block 340. A check may be made to determine whether the instruction has been bypassed, as shown in block 350. If the instruction has not been bypassed, the instruction is executed, as shown in block 360. If the execution of the instruction has been bypassed, the next instruction is obtained, as shown in block 370, and the flow of actions continues at block 320. Similarly, after the current instruction is executed, as shown in block 360, the next instruction is obtained, as shown in block 370, and the flow of actions continues at block 320. When an instruction executes, the instruction's SVal tag value is copied to the destination register(s).

When an instruction is a load and it misses the cache, its destination register SVal tag is set to one (1). When an instruction is a load and it hits the cache but the SVal tag of one of its source operands is set to one (1), the SVal tag of its destination register is set to one (1). The SVal tag of an instruction with immediately available operands is set to zero (0). In one embodiment, if a store buffer is utilized during speculative execution, the SVal tag may be propagated through the store buffer. In this embodiment, the store buffer may be augmented with an SVal tag in the form of a bit. When a store instruction writes to the store buffer, the instruction's SVal tag is propagated to the store buffer. When a load instruction reads from the store buffer, the SVal tag found in the store buffer entry is copied along with the data retrieved from the store buffer. In one embodiment, store instructions are sorted into two classes before being permitted to write to the store buffer. The first class of store instructions includes store instructions whose address generation register operands are scratch values. The second class of store instructions includes store instructions marked as scratch values whose address generation register operands are not scratch values. As to the first class, because the destination address is not known, the SVal tag is not propagated. As to the second class, because the destination address is known, the SVal tag is propagated to the store buffer. Loads are treated normally.

Figure 4:
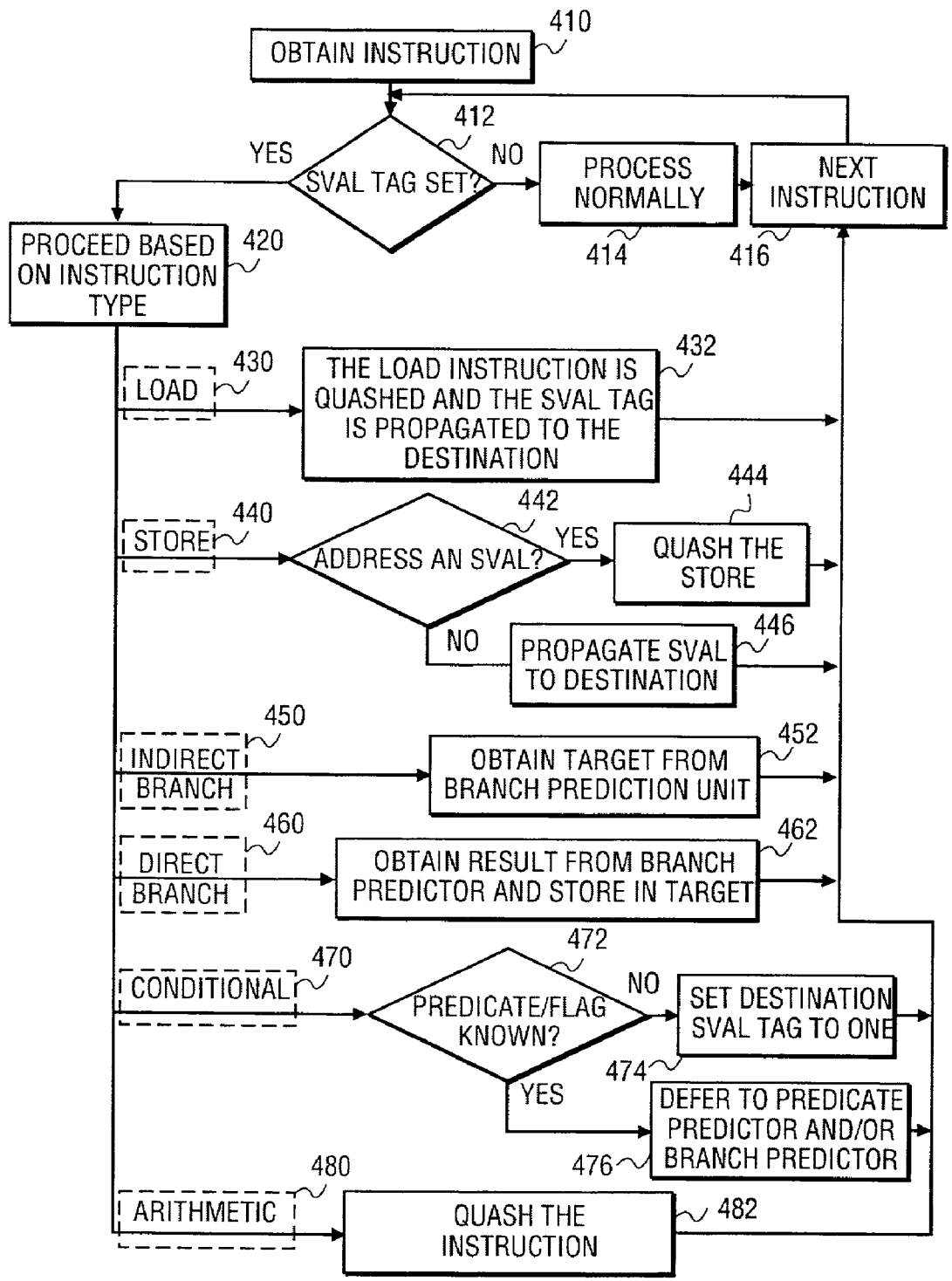
FIG. 4 illustrates, a flow of actions taken when processing instructions in a speculative processor according to an embodiment of a method described herein.

FIG. 4 illustrates a flow of actions taken when processing instructions in a speculative processor according to an embodiment of a method described herein. An instruction's SVal tag affects the way the instruction is handled in the pipeline and by a scheduler in a speculative processor. Instructions are handled differently depending on whether the SVal tag is set to zero (0) or another value. In one embodiment, a hardware designer may choose whether to propagate the SVal tag. In another embodiment, the SVal tag is not propagated unless it is highly likely that the propagated value is unreliable. In one embodiment, after an instruction is obtained, as shown in block 410, a check is made to determine whether the SVal tag for the instruction is set to one (1), as shown in block 412. If the SVal tag of an instruction is not set to one (1), that is, it is zero (0), the instruction is processed normally, as shown in block 414. Otherwise, the flow of actions proceeds based on the kind of instruction, as shown in block 420. If the instruction is a load instruction, as shown in block 430, the instruction is quashed and the SVal tag is propagated to the destination, as shown in block 432.

If the instruction is a store, as shown in block 440, the destination address is checked to determine if it is an SVal, as shown in block 442. If the destination address is an SVal, the instruction (that is, the store) is quashed. If the store value (i.e., data) is derived from an SVal, the SVal tag is propagated to the destination, as shown in block 446. If neither the address nor the value are SVals, the store is executed normally. In one embodiment, if the instruction is an arithmetic operation, as shown in block 480, it is quashed and the SVal tag is not propagated to the destination, as shown in block 482.

If the instruction is a direct branch, as shown in block 460, if the flag or register that the direct branch depends on is an SVal, the branch target is used but the direction of the branch is derived from the branch predictor, as shown in block 462. That is, the flag or predicate that the branch depends on is written with the value derived from the branch predictor. Similarly, flags and predicates that represent the complement of the flag or predicate that the branch depends on are written with the complement of the value derived from the branch predictor. For example, a "branch if not equal" (BNE) predicate taken can result in the not equal flag or condition to be set to true, and false can be written to the equal flag or predicate. When the flag or predicate value is derived from the branch predictor, the SVal tag on the flag or predicate is cleared and future branches are deferred to the branch predictor. If the instruction is an indirect branch, as shown in block 450, the branch target is obtained from the branch prediction unit, as shown in block 452.

If the instruction is a conditional, as shown in block 470, the predicates and flags associated with the instruction are resolved by deferring to the branch prediction unit. However, when a predicate or flag is unknown, the destination of the conditional move and predicate instruction are marked as SVals. That is, a check is made to determine if the pertinent predicates and flags are known, as shown in block 472. If they are not known, the destination SVal is set to one (1), as shown in block 474. If the predicates are known, the values are nonetheless deferred to the predicate predictor and/or to the branch predictor, as shown in block 476. In this way, a path based on questionably reliable predicates is precluded, and a more reliable path selection based on the predicate predictor and/or the branch predictor is used. In one embodiment, predicates and conditionals may be treated in a manner similar to source operands such that if the predicate or conditional has an SVal tag that is set to one (1), the SVal tag is propagated to the destination.

In one embodiment, rather than using marking data and instructions solely as SVals and RVals, additional markings may be used. In one embodiment, a predicted value or PVal may be added such that an SVal tag having a value of zero (0) is an RVal, an SVal tag having a value of one (1) is an SVal, and an SVal tag having a value of two (2) is a PVal. In this way, a value prediction or a lossy representation of the correct data value to approximate the correct value may be utilized in place of a scratch value. In this embodiment, execution of PVal tagged instructions may be completed with the predicted value. In this way, a processor may make intelligent choices as to how to proceed based on internal algorithms, logic, schemes and other techniques, both well-known and/or proprietary.

Figure 5:
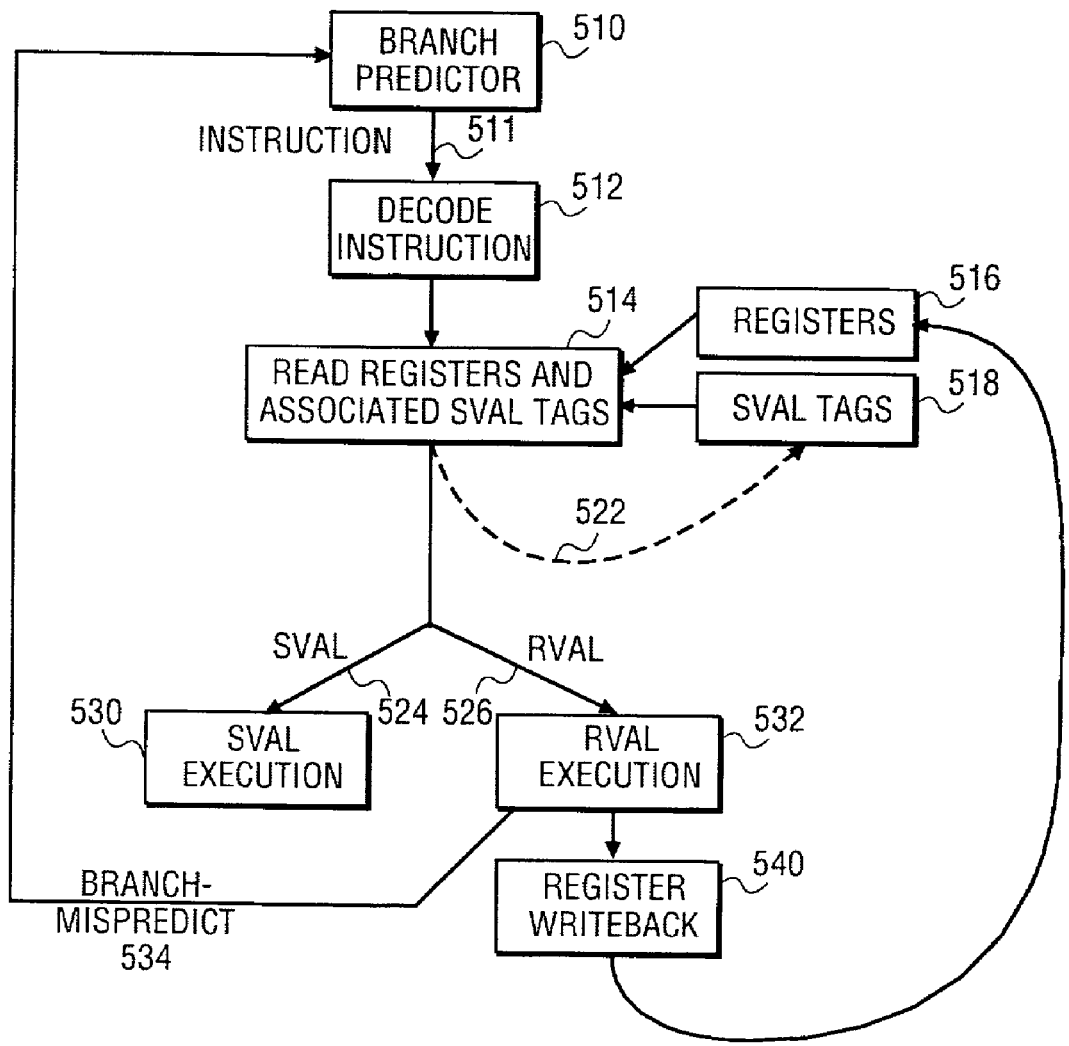
FIG. 5 illustrates a state machine according to one embodiment of the systems and methods described herein.

FIG. 5 illustrates a state machine according to an embodiment of the systems and methods described herein. In one embodiment, a processor may implement the instruction tagging discussed above in accordance with a state machine. After a branch predictor 510 chooses which instruction 511 to next execute, the instruction is decoded, as shown in block 512. The registers 516 containing data required by the instruction and associated SVal tags 518 are then read, as shown in block 514. If the registers have SVal tags that indicate the data in the associated register is a scratch value or unreliable value, the SVal tag is propagated to the SVal tag of any destination of the current instruction, as shown via path 522. The SVal tag may also be propagated through predicates, flags, etc. as discussed above. In addition, the SVal tag is propagated to the instruction itself.

If at least one of the operands to a current instruction is an SVal as indicated by SVal tags, as shown via path 524, the current instruction is specially executed according to SVal execution policies, as show in block 530. That is, the execution of the instruction is most often quashed. If the operand registers indicate by SVal tags that the operands are RVals, the execution of the instruction proceeds, as shown in block 532. If during execution of the instruction in block 532 a branch must be taken and the branch is derived from an SVal, a branch mispredict signal 534 is communicated to the branch predictor. Upon execution of an instruction, the results of the instruction may be written back to registers 516 via a register writeback unit, as shown in block 540.

In the foregoing specification, the invention has been described with reference to specific embodiments thereof. It will be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
   identifying scratch values generated during speculative execution of a processor,
   setting a tag associated with a register to indicate that the register holds a scratch value, when an instruction having the register as a destination results in a cache miss; and
   bypassing execution of instructions having at least one operand with an associated tag that indicates that the operand is a scratch value.

2. The method of claim 1 further comprising:
   propagating the tag to destination registers of the instructions to indicate that an operand within the destination registers is a scratch value.

3. The method of claim 1 further comprising:
   bypassing execution of an arithmetic instruction having at least one register as an operand with an associated tag indicating that the register contains data that is a scratch value; and
   bypassing execution of a store instruction involving a value derived from a register having an associated tag indicating that the register contains data that is a scratch value.

4. The method of claim 1 further comprising:
   utilizing a branch predictor to override computed branch results produced by branch instructions based on data having a tag that indicates the data is a scratch value.

5. The method of claim 1 further comprising:
   marking each instruction in a pipeline with a tag to indicate if the instruction involves a scratch value.

6. The method of claim 1 further comprising:
   propagating the tag through a store buffer if an address generation register does not indicate that the address generation register holds a scratch value.

7. A processor comprising:
   a plurality of registers having a corresponding plurality of register tags to indicate whether the data stored in the register holds a scratch value;
   a plurality of flags having a corresponding plurality of flag rags to indicate whether the data reflected by the flag is based on a scratch value;
   a plurality of predicates having a corresponding plurality of predicate tags to indicate whether the data reflected by the predicate is based on a scratch value; and an execution engine to bypass execution of instructions having at least one operand with an associated tag that indicates that the operand is a scratch value.

8. The processor of claim 7 having an instruction set including a plurality of instructions, each instruction augmented by an instruction tag to indicate whether the instruction involves a scratch value.

9. The processor of claim 8 wherein the register tags, flag tags, predicate tags, and instruction tags have a size of one bit.

10. The processor of claim 8 wherein the register tags, flag tags, predicate tags and instruction tags have a size of at least two bits.

11. A processor comprising:
   at least two arithmetic units;
   a translation look aside buffer;
   a branch prediction unit; and
   an execution engine having a plurality of instructions which when executed cause the processor to perform actions including:
      identifying scratch values generated during speculative execution of a processor,
      setting a tag associated with a register to indicate that the register holds a scratch value, when an instruction having the register as a destination results in a cache miss; and
      bypassing execution of instructions having at least one operand with an associated tag that indicates that the operand is a scratch value.

12. The processor of claim 11 wherein the execution engine has further instructions which when executed cause the processor to perform further actions comprising:
   propagating the tag to destination registers of the instructions to indicate that the operand within the destination registers is a scratch value.

13. The processor of claim 11 wherein the execution engine has further instructions which when executed cause the processor to perform further actions comprising:
   bypassing execution of an arithmetic instruction having at least one register as an operand with an associated tag indicating tat the register contains data that is a scratch value; and
   bypassing execution of a store instruction involving a value derived from the register having an associated tag indicating that the register contains data that is a scratch value.

14. The processor of claim 11 wherein the execution engine has further instructions which when executed cause the processor to perform further actions comprising:
   utilizing a branch predictor to override computed branch results produced by branch instructions based on data having a tag that indicates the data is a scratch value.

15. The processor of claim 11 wherein the execution engine has further instructions which when executed cause the processor to perform further actions comprising:
   marking each instruction in a pipeline with a tag to indicate if the instruction involves a scratch value.

16. The processor of claim 11 wherein the execution engine has further instructions which when executed cause the processor to perform further actions comprising:
   propagating the tag through a store buffer if an address generation register does not indicate that the address generation register holds a scratch value.

17. A system comprising:
   a memory, a storage device, and a processor each coupled to a bus;
   the processor including an execution engine having instructions which when executed by the processor cause the processor to perform actions including:
      identifying scratch values generated during speculative execution of a processor;
      setting a tag associated with a resister to indicate that the register holds a scratch value, when an instruction having the register as a destination results in a cache miss; and
      bypassing execution of instructions having at least one operand with an associated tag that indicates tat the operand is a scratch value.

18. The system of claim 17 wherein the execution engine has further instructions which when executed cause the processor to perform further actions comprising:
   propagating the tag to destination registers of the instructions indicate that an operand within the destination registers is a scratch value.

19. The system of claim 17 wherein the execution engine has further instructions which when executed cause the processor to perform further actions comprising:
   bypassing execution of an arithmetic instruction having at least one register as an operand with an associated tag indicating that the register contains data that is a scratch value; and
   bypassing execution of a store instruction involving a value derived from the register having an associated tag indicating that the register contains data that is a scratch value.

20. The system of claim 17 wherein the execution engine has further instructions which when executed cause the processor to perform further actions comprising:
   utilizing a branch predictor to override computed branch results produced by branch instructions based on data having a tag that indicates the data is a scratch value.

21. The system of claim 17 wherein the execution engine has further instructions which when executed cause the processor to perform further actions comprising:
   marking each instruction in a pipeline with a tag to indicate if the instruction involves a scratch value.

22. The system of claim 17 wherein the execution engine has further instructions which when executed cause the processor to perform further actions comprising:
   propagating the tag through a store buffer if an address generation register does not indicate that the address generation register holds a scratch value.

23. A machine readable medium having instructions stored thereon which when executed by a processor cause the processor to perform actions including:
   identifying scratch values generated during speculative execution of a processor;
   setting tag associated with register to indicate that the register holds a scratch value, when an instruction having the register as a destination results in a cache miss; and
   bypassing execution of instructions having at least one operand with an associated tag that indicates that the operand is a scratch value.

24. The machine readable medium of claim 23 having further instructions which when executed cause the processor to perform further actions comprising:
   propagating the tag to destination registers of the instructions to indicate that an operand within the destination registers is a scratch value.

25. The machine readable medium of claim 23 having further instructions which when executed cause the processor to perform further actions comprising:

bypassing execution of an arithmetic instruction having at least one register as an operand with an associated tag indicating that the register contains data that is a scratch value; and bypassing execution of a store instruction involving a value derived from the register having an associated tag indicating that the register contains data that is a scratch value.

26. The machine readable medium of claim 23 having further instructions which when executed cause the processor to perform further actions comprising:

utilizing a branch predictor to override computed branch results produced by branch instructions based on data having a tag that indicates the data is a scratch value.

27. A method comprising:

identifying scratch values generated during speculative execution of a processor;

setting at least one tag associated with at least one data area of the processor to indicate that the data area holds a scratch value; and utilizing a branch predictor to override computed branch results produced by branch instructions based on data having a tag that indicates the data is a scratch value.

28. A processor comprising:

at least two arithmetic units;

a translation look aside buffer;

a branch prediction unit; and an execution engine having a plurality of instructions which when executed cause the processor to perform actions including:

identifying scratch values generated during speculative execution of a processor, setting at least one tag associated with at least one data area of the processor to indicate that the data area holds a scratch value, and utilizing a branch predictor to override computed branch results produced by branch instructions based on data having a tag that indicates the data is a scratch value.

29. A system comprising:

a memory, a storage device, and a processor each coupled to a bus;

the processor including an execution engine having instructions which when executed by the processor cause the processor to perform actions including:

identifying scratch values generated during speculative execution of a processor, setting at least one tag associated with at Least one data area of the processor to indicate that the data area holds a scratch value, and utilizing a branch predictor to override computed branch results produced by branch instructions based on data having a tag that indicates the data is a scratch value.

30. A machine readable medium having instructions stored thereon which when executed by a processor cause the processor to perform actions including:

identifying scratch values generated during speculative execution of a processor;

selling at least one tag associated wit at least one data area of the processor to indicate that the data area holds a scratch value; and utilizing a branch predictor to override computed branch results produced by branch instructions based on data having a tag that indicates the data is a scratch value.

* * * * *

UNITED STATES PATENT AND TRADEMARK OFFICE
CERTIFICATE OF CORRECTION

PATENT NO. : 7,114,059 B2
APPLICATION NO. : 09/992881
DATED : September 26, 2006
INVENTOR(S) : Wilkerson Page 1 of 1

It is certified that error appears in the above-identified patent and that said Letters Patent is hereby corrected as shown below:

In column 8, at line 63, delete "rags" and insert --tags--.

In column 10, at line 11, delete "tat" and insert --that--.

In column 12, at line 15, delete "Least" and insert --least--.

Signed and Sealed this

Thirtieth Day of October, 2007

JON W. DUDAS
*Director of the United States Patent and Trademark Office*